Jan. 20, 1953     H. TATEYAMA     2,625,781

ONION HARVESTER MACHINE

Filed Nov. 9, 1950     3 Sheets-Sheet 1

Inventor
HIROSHI TATEYAMA

Attorney

Jan. 20, 1953 H. TATEYAMA 2,625,781
ONION HARVESTER MACHINE
Filed Nov. 9, 1950 3 Sheets-Sheet 2

Inventor
HIROSHI TATEYAMA
Wilbur A. E. Mitchell
Attorney

Jan. 20, 1953 H. TATEYAMA 2,625,781
ONION HARVESTER MACHINE
Filed Nov. 9, 1950 3 Sheets-Sheet 3

Inventor
HIROSHI TATEYAMA
Wilbur A. Mitchell.
Attorney

Patented Jan. 20, 1953

2,625,781

UNITED STATES PATENT OFFICE 2,625,781

ONION HARVESTER MACHINE

Hiroshi Tateyama, Ault, Colo.

Application November 9, 1950, Serial No. 194,885

1 Claim. (Cl. 55—106)

This invention relates to the farm machinery art, and more particularly to an onion harvesting machine.

So far as known by applicant, applicant is the first to successfully develop a single machine which will harvest and sack the onions in a single operation, permitting farm hands to ride on the machine for purpose of picking out the culls so that when sacked they will be of uniform grade. The difficulty in developing such a machine has been to provide for lifting and holding of the onion tops, so that the tops only will be severed by the knife means and not the onion bulb, and then to provide suitable means for disposing of the cut tops to a different point of destination apart from the severed bulbs and so as not to clog the machine.

It is a principal object of this invention to provide such a machine having a single frame and cart structure, having a novel digger point and top lifter fingers, a novel combination of conveyors, a top cutter, a cut-top conveyor separate from the main conveyor, and a picker platform from which manual sorting or grading may be made before the machine automatically sacks the onions.

Another principal object is the provision of such a machine having a main conveyor, from a point above the ground extending to the picking platform, and a front stub conveyor over the main conveyor and extending forwardly thereof and into the dug ground just behind the digger shovel and capable also of digging the ground and having a digger shovel and a novel arrangement of top lifter fingers extending forwardly therefrom.

Another principal object of this invention is the provision of a single pair of endless wedge-like belts, with one side of the loop of each spaced apart in a plane parallel with and above the conveyors, adapted for carrying the dug onions by their tops in vertical relationship along the machine until those onions reach the knives and then depositing the cut tops onto a cut top disposal transverse conveyor.

Another principal object is the provision of a novel set of onion bulb guide rods positioned ahead of the rotary cutters for guiding the bulb portion of the onions so that said portions will not be cut when the tops are severed therefrom, in combination with such wedge-like pair of single plane top holding conveyor and cutters.

Another principal object of this invention is the provision of a novel cut top conveyor, positioned to catch the cut tops and convey them transversely for discharge to one side of the machine from a point above the main conveyor and at the end of the said wedge belt single conveyor, so as to completely eliminate those tops from the machine.

Other and sundry objects will be apparent from the detailed descriptions of the various views of the drawings, in which.

Throughout the various views of the drawings I have used like reference characters to represent like parts.

Figure 1:
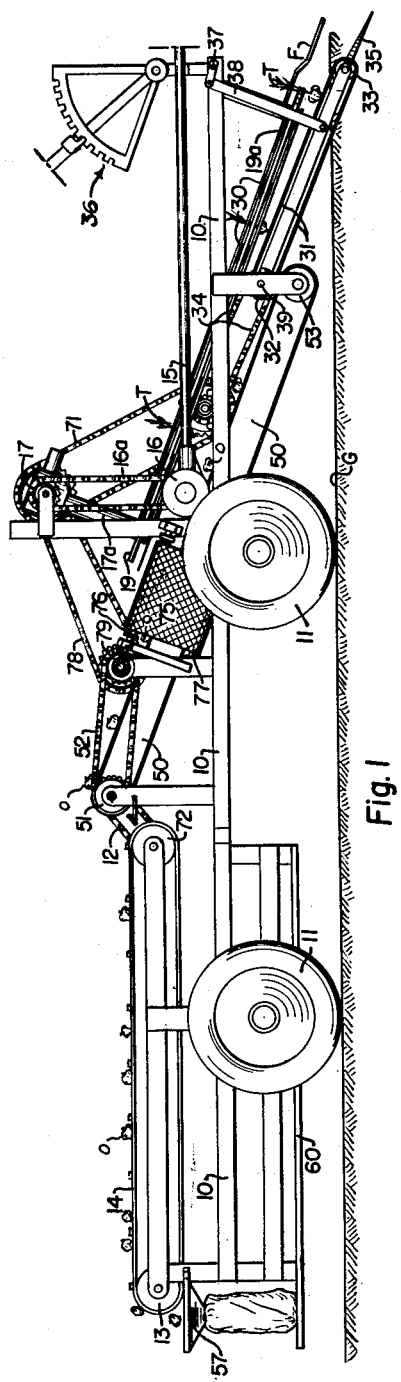
Figure 1 is an elevational view of my harvester machine.
Figure 2:
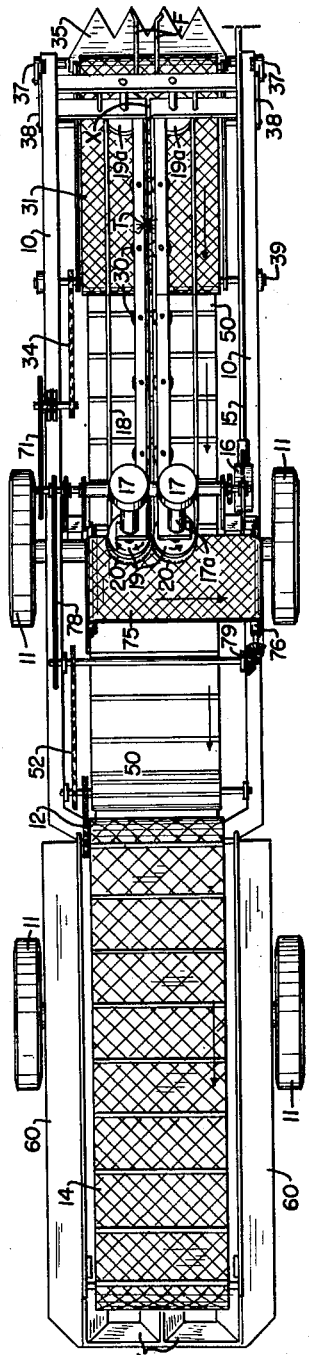
Figure 2 is a top or plan view thereof.

I provide a large four wheeled machine, having a main horizontal frame 10, extending well forwardly and rearwardly of the wheels 11, as well as between said wheels, in one plane. A main conveyor 50 is operably supported through said frame, as illustrated, from a point above the ground and forwardly of the front wheels to a point above the frame and about midway between the front and back wheels. The conveyor 50 is driven by a driving wheel drum, 51, by a drive chain 52, and extends over an idle wheel drum 53. Each of those drums are of the open type, to permit dirt to fall therethrough. Said conveyor is in a stationary position with relation to the frame. The source of power from the tractor, to which the machine is attached and which is not illustrated, is connected through a conventional drive shaft 15, and drives the driving drum wheel 51 through conventional power take-off and driving means including the belt drive chains 78 and 52 and chain drive means. I pivotally mount a front stub conveyor 31 at its rear at pivot point 39 on a depending rigid frame arm, just above the front of main conveyor 50. Stub conveyor 31 is of a length adapted to extend forwardly with its front conveyor belt 31 well into and under the ground surface G. Said conveyor 31 is an endless mesh type belt conveyor having transverse slats, driven by a driving pulley drum 32 and extending over idle drum 33. Drive chain, 34, suitably connected with the source of power, drives drum 32. That power connection is made through an idle shaft and a power chain 71. The onions are indicated as O. A saw toothed front edge digger shovel 35 is rigidly secured to the front of the frame of the stub conveyor 31, substantially in longitudinal prolongation of that conveyor, as illustrated. The front edge of the shovel is designed to extend into the ground about six inches, to sever the root of the onion, and acts as a skid means for bringing the dug onions thereon up to the stub conveyor 31 due to the forward motion of the machine. It will be noted that just above the shovel I provide a plurality of onion top lifter finger bars F, spaced and positioned one beside the other as illustrated. Said fingers F are designed to scoop under the usually massed and fallen or matted onion tops and to guide them upwardly to the front wedge belt conveyor entrance point, designated as X, for reason to be explained, during the forward motion of the machine. The onion tops are designated as T. The front of the stub conveyor 31 is pivotally connected with a crank rod 37 by a bar 38. Connected with that crank, in the conventional manner, is a lever and quadrant assembly, designated as 36, adapted for raising and lowering of the front of the stub conveyor 31 on its pivot 39, for inserting the digger shovel and the front of the stub conveyor 31 into and out of digging relationship with relation to the level of the ground.

Figure 3:
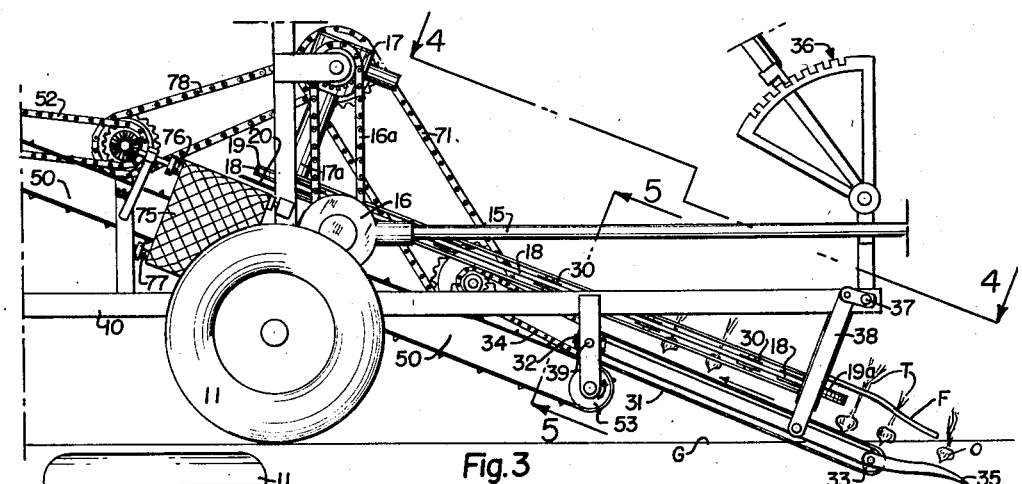
Figure 3 is an enlarged partial side view of the front end of my machine.
Figure 4:
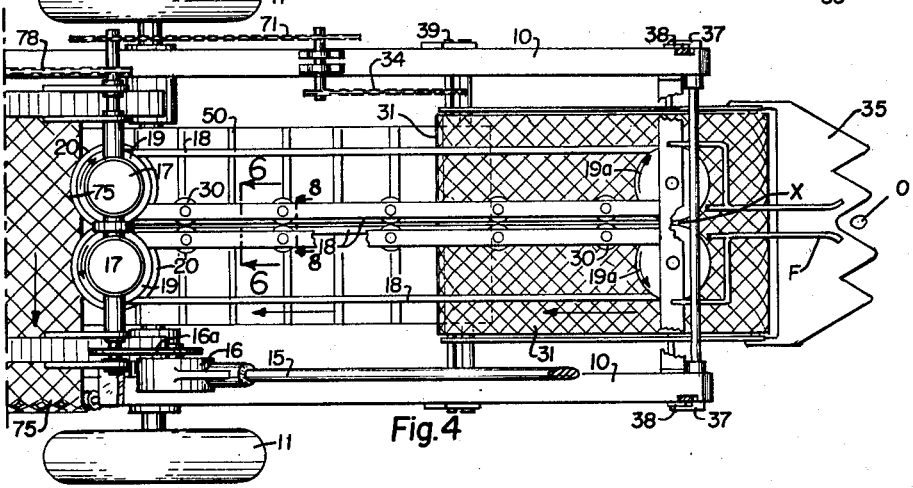
Figure 4 is an enlarged partial plan view of said front portion and taken on line 4—4 of Figure 3, illustrating my novel endless pair of wedge-like belts with relation to the cutters and the conveyors.
Figure 6:
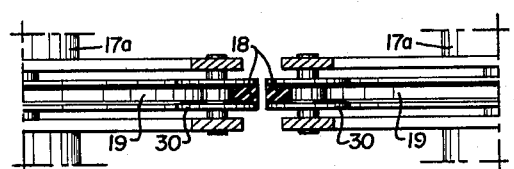
Figure 6 is an enlarged vertical sectional view showing the construction and relative arrangement of the pair of wedge-like belts comprising a single conveyor, taken on the line 6—6 of Figure 4.
Figure 5:
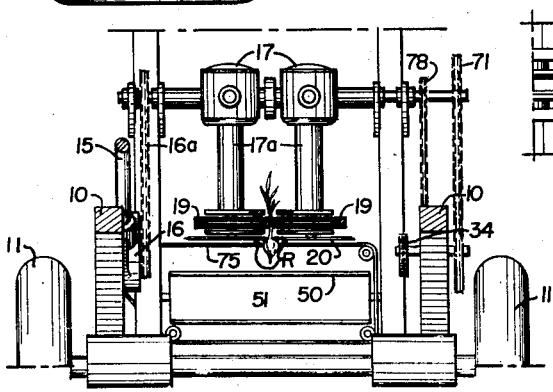
Figure 5 is a vertical cross-sectional view taken on the line 5—5 of Figure 3, looking in the direction of the arrows, illustrative of the relative positioning of the said wedge-like belts conveyor, the cut-tops transverse conveyor and the main conveyor.
Figure 7:
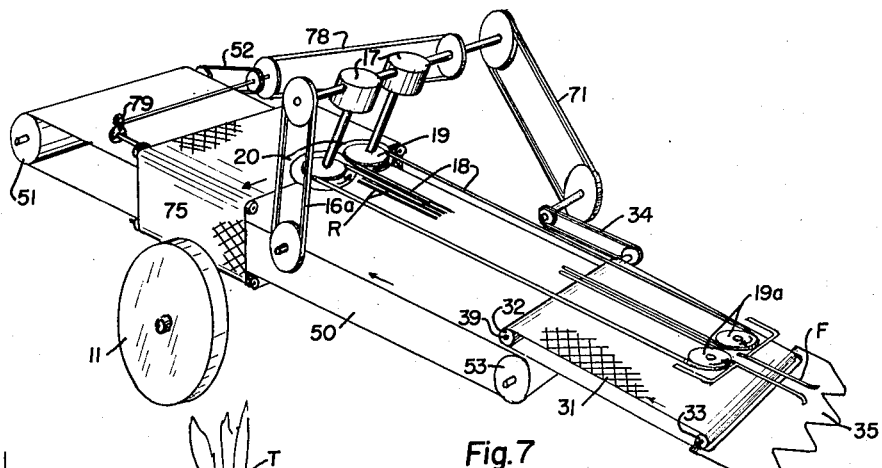
Figure 7 is an isometric-perspective view illustrative of the positioning of the digger from the front stub conveyor over the main conveyor, the transverse cut top conveyor, the central overhead single pair of aligned wedge-like aligner conveyor ahead of the rotary knives, the top lifter fingers F and the bulb guide rods R ahead of the knives.
Figure 8:
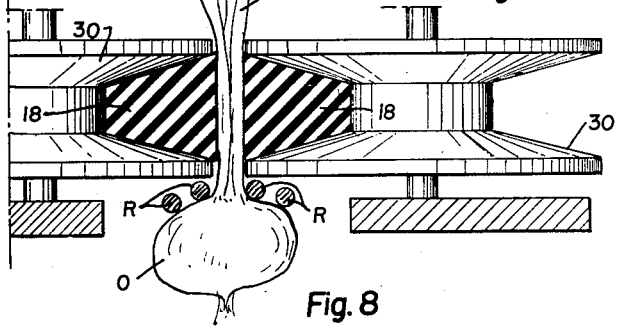
Figure 8 is an enlarged vertical cross-sectional detail view of the wedge conveyor 18—18 and the guide rods R, taken on the line 8—8 of Figure 4.
Figure 9:
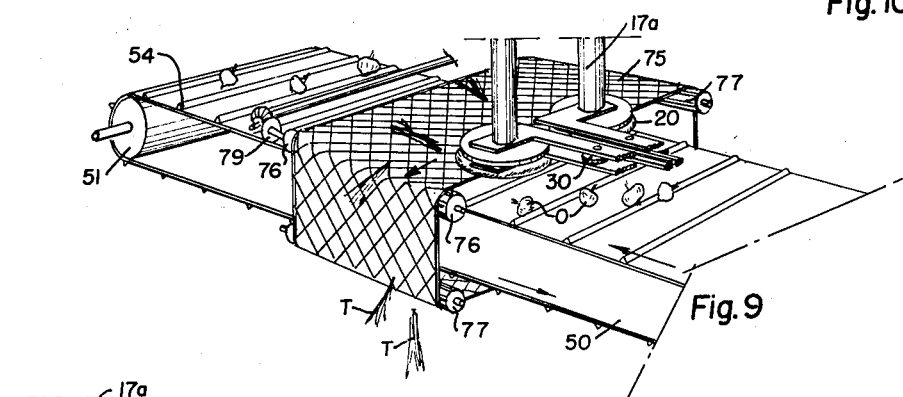
Figure 9 is an enlarged perspective fragmentary view illustrative of the transverse cut top conveyor with relationship to the cutters and the main conveyor.
Figure 9A:
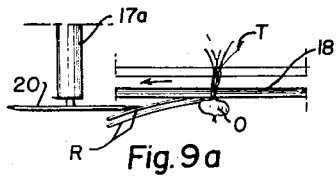
Figure 9a is a fragmentary enlarged view of the positioning of my bulb guide rods, R, with relation to the rotary knives and the wedge conveyor belt.

Gear box 16 takes the power from drive shaft 15 and distributes it, conventionally, by suitable connections to the various operative parts, through a drive chain 16a. When the forward motion of the machine pushes the lifting fingers F under the tops T, those fingers cause the tops to slide there-along to the point X where the tops are caught between a single pair of wedge shaped endless conveyor belts, as illustrated in Figures 4, 5, 6, 7 and 8. Referring to Figures 4 and 8, it will be seen that said wedge belts 18 each operate in a loop, by suitable drive pulley means, and are positioned in one plane parallel with and above the main and stub conveyors, 50 and 31, respectively, and are so positioned with relation to each other that the relatively restricted space between aligned adjacent sides of the loops thereof is adapted for receiving and holding the tops of an onion bulb therebetween, due to the said wedge belts each travelling in an opposite direction. As illustrated in Figure 4, looking from the front of the machine, the right hand one of said belts moves clockwise, and the left hand one moves counter-clockwise, which causes the center side of each loop to move in the same direction, thereby causing the tops of the onions caught between said center sides to be propelled rearwardly or in that common direction of travel. The driving of the wedge belts, as just described, is accomplished by suitable gear housings 17 connected with drive chain 16a, each housing having a shaft drive within a housing 17a, as illustrated, in Figures 3, 4 and 5. Each wedge belt is driven by a wheel 19, suitably connected with its source of power through its housing 17a. Each wedge belt has an idle pulley wheel 19a, and, throughout the length of the adjacent center sides of the loops of said belts, guide wheels 30 are provided to strengthen the stress against those belts caused by the carried onion tops therebetween. As illustrated in Figures 3, 4 and 5, I provide a pair of rotary knives 20, with the blades in substantially a common plane with each other and said plane being parallel with the main conveyor 50 and with the direction of travel of the wedge belt conveyor 18—18. Said knives slightly overlap each other, and such juncture overlapping is positioned such that the onion tops will strike at that point of overlapping and be severed thereby. Rotation of the knives is accomplished by the same power shafts as turn the drive pulleys of the pair of wedge belts, each knife being keyed to the extended shaft which drives its adjacent one of said pulleys, so that the knives rotate, necessarily, in the same direction as its adjacent wedge drive pulley wheel. The rotary knives 20 are positioned just immediately below the adjacent belts 18. I provide a novel plurality of bulb guide rods R extending from below the knives 20 upwardly and forwardly under the belts 18, to ride above the onion bulbs O, to draw those bulbs downwardly to a point where they will be protected from being cut by the knives, as the knives cut the onion tops, as illustrated in Figure 9a. The cutting of the tops is accomplished by the single pair of wedge belts 18 carrying the onions, each in an upright position, along until they contact the rotating knives 20, at which latter point the severance of the onion bulb from its tops is accomplished. The bulb then falls onto the conveyor 50. Transverse strips on the conveyor 50 act to catch the severed bulb and to carry it along until the picker conveyor 14 is reached, as will be explained. At the end of the frame 10, another conveyor 14 is provided, which is operated by a drive drum 72, and extends over an idle drum 13. Drive chains 78, 52 and 12 act to transmit the driving power for operating the picker conveyor 14. 14 is called a picker conveyor, for the reason that farm hands stand on platforms 60, secured alongside the frame 10 for the purpose, and manually pick out and discard any culls among the severed onion bulbs from that conveyor. Each of the conveyors, 50, 31 and 14, is of the open wire belt mesh type, so that dirt thereon will fall through same, and the drums over which each travels is likewise of an open type for the same reason. At the extreme end of the rear of the frame 10, at the end of the picker conveyor 14, I provide a sack loading platform adapted for holding several sacks into which conveyor 14 automatically dumps the onions. The onions are guided into the respective sacks there by guide chutes 57, provided for receiving the onions as they fall off the conveyor 14.

Figure 10:
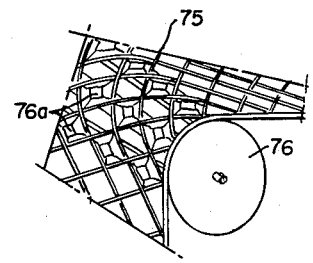
Figure 10 is a partial elevational view of the construction of the drive drum of my transverse cut-top conveyor 75.

As the onion tops T are severed by the rotary knives, on reaching the end of travel of the wedge belts 18 carrying the onions to said knives, said tops fall onto a novel transverse cut-top conveyor 75 which is positioned beginning just under the cutting contact point of the pair of rotary knives and rearwardly therefrom. That conveyor is driven by a drum-like squirrel cage self cleaning wheel 76, having lugs 76a extending outwardly, in meshed relationship with the meshes of the endless belt conveyor 75, from each drum bar of said squirrel cage wheel, as illustrated in Figure 10. Such type conveyor and drum drive wheel act to automatically clean itself, as a result of the meshed belt and lug arrangement during operation of the conveyor, and thus prevents the cut tops from becoming matted into said conveyor. There are four squirrel cage wheels over which conveyor belt 75 operates, of which three are idle drum-like wheels 77. 79 represents the power take off for operating the cut-top conveyor 14.

As explained, the forward motion of my machine, as pulled by a tractor, causes the shovel 35 to raise the onions and they are elevated, as the machine continues forwardly, by riding against the finger lifter bars F, which fingers cause the tops to be centered and raised to point X at the front of the single abutting pair of wedge conveyor belts 18. Said single wedge conveyor belts, 18, then carry the onions, as illustrated in Figure 8, by the tops of each, thereby having the bulb portion of each hanging downwardly from the point where the tops thereof are wedgedly held between the belts 18, and the onions are carried along in that relationship by the belts 18 until the stem of the onion reaches the rotary knives 20, which knives slightly overlap each other and, as a result they instantly sever the tops from the bulb of each onion due to the revolving of said knives. The cut tops are then carried by the belts 18 until the belts follow their drive drums 19 when the tops then fall onto the transverse conveyor 75. I provide a cleaner blade positioned to ride on each rotary knife, not illustrated, to keep those knives clean of particles of dirt, and gum from the tops. Occasionally onions in the field will have developed, due to weather conditions and the season or the harvest period, when the tops thereof will be occasionally substantially dried or withered, resulting in inability of the top lifting fingers to raise said tops and align them with the pick-up point X of the conveyor 18—18, with the further result that such onions will be carried by the conveyor 31 up onto the main conveyor 50 and by the latter to the picker conveyor 14. Any such dried tops or untopped onions will be found by the farm labor hands, riding on platforms 60, who will manually remove such tops. My novel bulb guide rods R, extending from just below the rotary knives 20 upwardly and forwardly to adjacent the belt 18—18, to keep the onion bulbs of the onions being carried toward said knives from being cut by the knives, is an important part of my combination, comprising bulb guide and protecting means. Likewise of importance are my forwardly extending plurality of top lifting or pick-up fingers F, ahead of the stub conveyor 31, comprising forward top-skid and elevating means in combination with that stub conveyor. Relative to that stub conveyor, it is to be noted that the front end thereof operates in the dug ground, so that any onions which might get through the fingers F will be raised out of the ground thereby. The direction of travel of each conveyor is indicated by directional arrows. Referring to Figure 9, it will be seen that the severed onion bulbs, as a result of knives 20 severing the onion stems and tops, fall onto the main conveyor 50, and that then said severed bulbs are carried by 50 upwardly and under the top portion of the transverse conveyor 75, as said latter conveyor has its top portion positioned to permit said bulbs to be carried on the upwardly moving top surface of the conveyor 50 without being obstructed by 75.

It will be obvious that my new machine may be put to other uses besides onion harvesting. For instance it could be used to harvest other vegetables, having a more or less centerized top or stem or foliage, such as carrots and the like, and it is understood that I do not wish to be limited in its use, having herein mentioned and described same only for example as being used in connection with the harvesting of onions.

As many changes and modifications may be made in my machine without deviating from the teaching, spirit and scope thereof, I wish to be bound only by the hereunto appended claim.

What I claim and desire to secure by Letters Patent is:

A vegetable harvesting machine adapted to be pulled by a tractor and having a power take-off connection from the tractor, comprising, in combination, a single non-moveable horizontal frame structure mounted on a plurality of wheels, a main elevator conveyor extending within said frame from a forward point thereof adjacent the ground backwardly to a higher point adjacent the center of the machine, a stub digger conveyor pivotally mounted adjacent its rear end from a point adjacent the front of and over the main conveyor and having adjustable means adapted for raising and lowering its front end on said pivot with relation to the surface of the ground, a digger shovel extending forwardly of said stub conveyor in substantial prolongation of the longitudinal center line thereof, both the front end of said stub conveyor and said shovel being adapted to operate in the ground, said means being connected with said frame, finger means secured to said frame and extending forwardly of said stub conveyor and shovel and being adapted to skid under the vegetable tops and thereby elevate them to a point above said conveyor upon forward motion of the machine, a single pair of endless wedge-like belts positioned in a plane above and parallel with said conveyors from said point rearwardly and comprising a top holding conveyor means, a plurality of rotating rotary knives positioned in the line of travel of the tops of the vegetables held by said top holding conveyor means and being adjacent one end of and below the top holding means and above said main conveyor for severing the vegetable bulbs from their tops upon contact therewith, bulb guide rod means secured to said frame and positioned to protect the bulbs of the vegetables from contacting said knives during said severing, said rod means being positioned adjacent said knives and in the path of travel of said vegetables toward said knives, a transverse cut tops conveyor operatively mounted on said frame and positioned and adapted so as to convey said cut tops falling from said knives to a point at one side of the machine, a picking platform portion of the machine at the rear thereof opposite said finger means and having steps therearound, a horizontal conveyor comprising said upper surface of said platform and being adapted to receive the onion bulbs thereon from the main conveyor at the front end thereof, automatic top loader chute means cooperating with said horizontal conveyor for directing said bulbs from said conveyor platform into sacks, separate means for operatively mounting each of said conveyors, and power take-off connection means for operating each of said conveyors and each of said knives, each of said pair of wedge-like belts being operable in an opposite direction with relation to each other, and each of said rotary knives being operable in an opposite direction with relation to each other.

HIROSHI TATEYAMA.

REFERENCES CITED

The following references are of record in the file of this patent:

UNITED STATES PATENTS

| Number | Name | Date |
|---|---|---|
| 721,496 | Bartlett | Feb. 24, 1903 |
| 848,089 | Dotson | Mar. 26, 1907 |
| 989,279 | Olson | Apr. 11, 1911 |
| 1,086,631 | Weaver | Feb. 10, 1914 |
| 1,173,042 | Scheetz | Feb. 22, 1916 |
| 1,198,985 | Ackerman | Sept. 19, 1916 |
| 1,989,152 | Rassmann | Jan. 29, 1935 |
| 2,368,895 | Spiegl | Feb. 6, 1945 |